United States Patent
Xhafa et al.

(10) Patent No.: US 11,700,577 B2
(45) Date of Patent: *Jul. 11, 2023

(54) BEACON SCHEDULING FOR WIRELESS NETWORKS

(71) Applicant: TEXAS INSTRUMENTS INCORPORATED, Dallas, TX (US)

(72) Inventors: Ariton E. Xhafa, Plano, TX (US); Bradford James Campbell, Ann Arbor, MI (US); Anuj Batra, Dallas, TX (US); Srinath Hosur, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 83 days.

This patent is subject to a terminal disclaimer.

(21) Appl. No.: 17/242,872

(22) Filed: Apr. 28, 2021

(65) Prior Publication Data

US 2021/0250859 A1  Aug. 12, 2021

Related U.S. Application Data

(63) Continuation of application No. 13/951,798, filed on Jul. 26, 2013, now Pat. No. 11,026,170.

(60) Provisional application No. 61/678,316, filed on Aug. 1, 2012.

(51) Int. Cl.
*H04W 52/02* (2009.01)

(52) U.S. Cl.
CPC ......... *H04W 52/0216* (2013.01); *Y02D 30/70* (2020.08)

(58) Field of Classification Search
None
See application file for complete search history.

(56) References Cited

U.S. PATENT DOCUMENTS

| | | |
|---|---|---|
| 7,474,686 B2 | 1/2009 | Ho |
| 7,881,340 B2 | 2/2011 | Farrag et al. |
| 7,936,709 B2 | 5/2011 | Bhatti et al. |
| 8,149,803 B2 | 4/2012 | Pan et al. |
| 8,432,887 B1 | 4/2013 | Ding |
| 8,654,671 B2 | 2/2014 | Shim et al. |
| 9,031,007 B2 | 5/2015 | Shin et al. |
| 10,778,280 B2 | 9/2020 | Yeo |
| 2003/0103487 A1 | 6/2003 | Kim et al. |
| 2004/0114563 A1 | 6/2004 | Shvodian |
| 2005/0085214 A1 | 4/2005 | Laroia et al. |

(Continued)

*Primary Examiner* — Steve R Young
(74) *Attorney, Agent, or Firm* — Mandy Barsilai Fernandez; Frank D. Cimino

(57) ABSTRACT

A system and method for reducing energy consumption in a wireless network. In one embodiment, a system includes a network coordinator configured to manage access to a wireless network. The network coordinator includes a controller. The controller is configured to define a channel hopping list that specifies on which channel a beacon signal is transmitted in each slot frame of the wireless network. The controller is also configured to set a number of time slots in each slot frame based on a length of the channel hopping list. The controller is further configured to transmit a first beacon signal in each slot frame on a channel specified by the channel hopping list. The number of slots in each slot frame causes the first beacon signal to be transmitted on a same channel in each slot frame.

19 Claims, 2 Drawing Sheets

(56) References Cited

U.S. PATENT DOCUMENTS

| | | |
|---|---|---|
| 2005/0249170 A1 | 11/2005 | Salokannel |
| 2006/0092909 A1 | 5/2006 | Ho |
| 2006/0140215 A1 | 6/2006 | Fleming |
| 2008/0013479 A1 | 1/2008 | Li et al. |
| 2008/0253327 A1 | 10/2008 | Kohvakka et al. |
| 2009/0016314 A1 | 1/2009 | Kim |
| 2009/0257396 A1* | 10/2009 | Eliezer ............... H04B 1/036 375/132 |
| 2010/0177718 A1 | 7/2010 | Harle et al. |
| 2010/0202354 A1 | 8/2010 | Ho |
| 2010/0260085 A1* | 10/2010 | Wang ............... H04W 74/02 370/311 |
| 2010/0296493 A1* | 11/2010 | Lee ............... H04B 1/7143 370/336 |
| 2011/0150042 A1 | 6/2011 | Liu |
| 2011/0164605 A1* | 7/2011 | Zhen ............... H04W 56/00 370/347 |
| 2011/0211461 A1 | 9/2011 | Bahr et al. |
| 2012/0069869 A1* | 3/2012 | Jeong ............... H04L 12/40013 375/132 |
| 2013/0094481 A1 | 4/2013 | Jeong et al. |
| 2018/0248860 A1 | 8/2018 | Xhafa |

\* cited by examiner

BEACON SCHEDULING FOR WIRELESS NETWORKS

CROSS-REFERENCE TO RELATED APPLICATION

The present application is a continuation of U.S. patent application Ser. No. 13/951,798, filed on Jul. 26, 2013, which claims priority to U.S. Provisional Patent Application No. 61/678,316, filed on Aug. 1, 2012; which are hereby incorporated herein by reference in their entirety.

BACKGROUND

Wireless sensor networks are used in a variety of applications, including industrial process monitoring and control, environmental monitoring, military systems, etc. The sensor nodes of a wireless sensor network are generally powered by battery. Because battery replacement is not cost effective, it is beneficial for the sensor nodes of the wireless sensor network to operate for as long as possible after deployment without battery replacement.

For a sensor node to join a wireless network, the sensor node must receive at least one beacon from a coordinator. To facilitate network access, the coordinator periodically transmits beacons for use by the sensor nodes.

SUMMARY

A system and method for reducing energy consumption in a wireless network are disclosed herein. In one embodiment, a method includes defining, by a network coordinator for a wireless network, a channel hopping list that specifies on which channel of the wireless network a beacon signal is transmitted in each slot frame of the wireless network. A number of timeslots in each slot frame, is set by the network coordinator, to be an integer multiple of a length of the channel hopping list. A first beacon signal is transmitted, by the network coordinator, in each slot frame on a channel specified by the channel hopping list. The setting of the number of timeslots in each slot frame causes the first beacon signal to be transmitted on a same channel in each slot frame.

In another embodiment, a system includes a network coordinator configured to manage access to a wireless network. The network coordinator includes a controller. The controller is configured to define a channel hopping list that specifies on which channel a beacon signal is transmitted in each slot frame of the wireless network. The controller is also configured to set a number of time slots in each slot frame based on a length of the channel hopping list. The controller is further configured to transmit a first beacon signal in each slot frame on a channel specified by the channel hopping list. The number of slots in each slot frame causes the first beacon signal to be transmitted on a same channel in each slot frame.

In a further embodiment, a network coordinator includes a wireless transceiver and a controller. The wireless transceiver is configured to communicate via a wireless network. The controller is configured to define a channel hopping list that specifies on which channel a beacon signal is transmitted in each slot frame of the wireless network. The controller is also configured to set a number of timeslots in each slot frame based on a length of the channel hopping list. The controller is further configured to transmit a first beacon signal in each slot frame on a channel specified by the channel hopping list. The number of slots in each slot frame causes the first beacon signal to be transmitted on a same channel in each slot frame.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
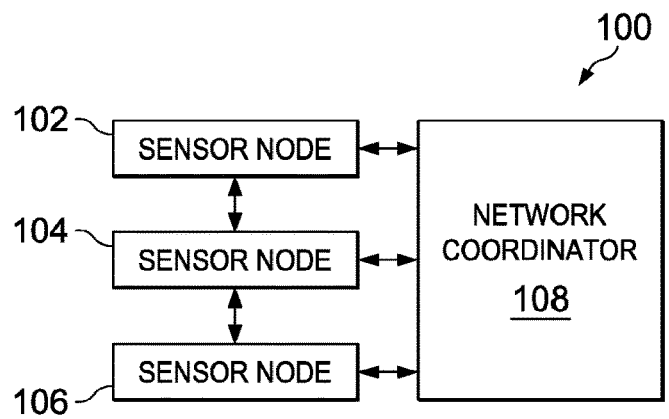
FIG. 1 shows a block diagram of an illustrative wireless sensor network in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In a wireless sensor network, whether a sensor node is powered by a battery or energy harvesting, the lifetime and/or usefulness of the node is limited by the energy available to power the node. Consequently, the useful life of the sensor node may be extended by reducing sensor node energy consumption.

In a conventional wireless sensor network, connecting a node to the network consumes a substantial amount of power. Much of this power is spent scanning the channels of the network to identify a beacon signal. The network generally provides communication over a plurality of channels (e.g., 16 channels), and conventional sensor nodes are unable to predict on which channel a beacon may be transmitted in a given slot frame. Therefore, in order to join the network, a sensor mode in a conventional network must scan all of the channels of the network, expending significant energy in the process, to identify a beacon transmission.

Embodiments of the present disclosure reduce the time and energy spent by sensor nodes in locating a beacon signal. Embodiments of the wireless network disclosed herein set the number of time slots in each slot frame in accordance with the length of the channel hopping sequence applied by the wireless network. By establishing a relationship between the length of the slot frame and the length of the channel hopping sequence, embodiments limit the number of channels employed for beacon transmission. In turn, the energy spent by a sensor node to identify a beacon transmission is substantially reduced, and the useful life of the sensor node is correspondingly extended.

FIG. 1 shows a block diagram of an illustrative wireless sensor network 100 in accordance with various embodiments. The network 100 includes a network coordinator 108 and a plurality of sensor nodes (102, 104, 106), also referred to as wireless sensor devices or simply, nodes. Wireless sensor nodes 102-106 detect a condition of the environment in which they are deployed, and wirelessly communicate information indicative of the sensed environment to the network coordinator 108. Each wireless sensor node may communicate with neighboring wireless sensor nodes to form an ad-hoc network in which a wireless sensor node repeats transmissions received from other sensor nodes to relay data through the network 100.

The network coordinator 108 may be configured to manage the sensor nodes 102-106, collect and analyze data received from sensor nodes 102-106, and connect the network 100 with a wide area network (WAN) for remote data access. The network coordinator 108 receives measurements and other information transmitted from the sensor nodes 102-106, and may provide control information, including but not limited to, a beacon signal to the sensor nodes 102-106. Further, each sensor node may also provide control information to neighboring nodes. While, as a matter of convenience, FIG. 1 shows only three sensor nodes 102-106 and a single network coordinator 108, in practice, the network 100 may include any number of sensor nodes and coordinators.

The network coordinator 108 includes logic that controls beacon transmission. The logic sets the number of time slots in each slot frame to be a function of the length of the channel hopping sequence employed by the network 100. The relationship between the slot frame length and the hopping sequence list length reduces the number of channels used for beacon transmission, and correspondingly reduces the energy used by the sensor nodes 102-106 to identify a beacon.

Some embodiments of the network 100 may operate in accordance with an IEEE 802.15.4e standard. However, the principles disclosed herein are not limited to such standards, but rather are applicable to a wide variety of wireless networking systems.

Figure 2:
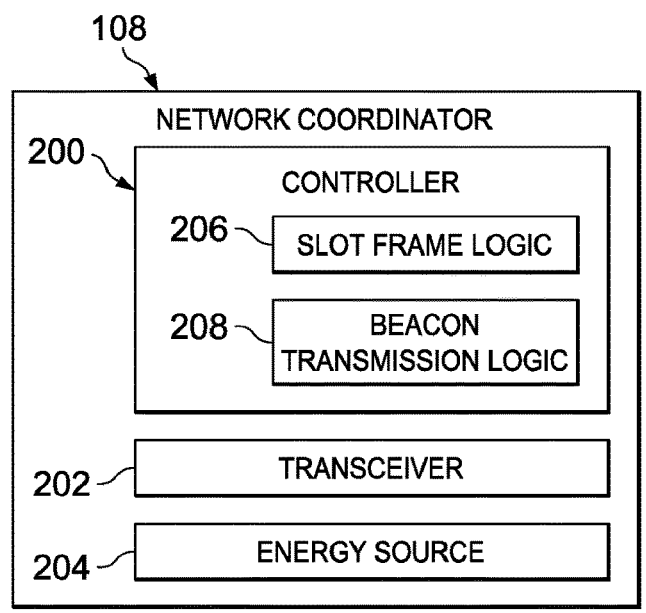
FIG. 2 shows a block diagram of a network coordinator for use in a wireless sensor network in accordance with various embodiments.

FIG. 2 shows a block diagram of the network coordinator 108 in accordance with various embodiments. The network coordinator 108 manages the wireless sensor nodes 102-106 and various operational aspects of the network 100. The network coordinator 108 includes a controller 200, a wireless transceiver 202 and an energy source 204. The controller 200 may be a processor, such as a general-purpose microprocessor, or other instruction execution device suitable for use in the network coordinator 108. The energy source 204 provides power to operate the controller 200, the transceiver 202 and other components of the network coordinator 108. The energy source 204 may include a battery, an energy harvesting system, and/or other power source suitable for use in the network coordinator 108.

The transceiver 202 provides communication via a wireless network. The transceiver 202 is coupled to the controller 200, and provides information received via the wireless network to the controller 200. For example, the transceiver 202 may provide to the controller 200, values measured by the sensor nodes 102-106, and other information received via the wireless network. The transceiver 202 also transmits beacon signals, and other information, to the sensor nodes 102-106 under the direction of the controller 200.

The controller 200 includes slot frame logic 206 and beacon transmission logic 208. The slot frame logic 206 determines the number of time slots to be included in the slot frame. The beacon transmission logic 208 determines when and on what channel of the wireless network a beacon signal is to be transmitted. The slot frame logic 206 sets the number of time slots to be included in the slot frame based on the length of the channel hopping sequence, thereby reducing the number of channels applied for beacon transmission by the beacon transmission logic 208. In some embodiments, the controller 200 may provide the slot frame logic 206 and the beacon transmission logic 208 by executing instructions retrieved from a memory device (not shown).

Figure 3:
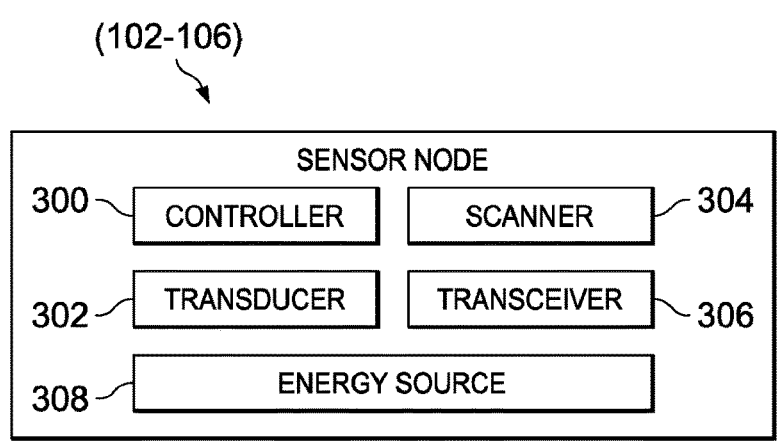
FIG. 3 shows a block diagram of a wireless device for use in a wireless sensor network in accordance with various embodiments.

FIG. 3 shows a block diagram of the wireless sensor node 102 in accordance with various embodiments. The block diagram may also be applicable to the sensor nodes 104, 106. The sensor node 102 includes a controller 300, a transducer 302, a scanner 304, a wireless transceiver 306 and energy source 308. The transducer 302 is configured to detect conditions about the wireless sensor node 102 and provide measurements of the conditions for transmission to the network coordinator 108. For example, embodiments of the sensor node 102 may measure temperature, pressure, electrical current, humidity, or any other parameters associated with the environment in which the wireless sensor node 102 is deployed.

The transceiver 306 converts signals between electrical and electromagnetic forms to allow the wireless sensor node 102 to communicate with the sensor nodes 104 and 106, the coordinator 108, and other devices in the network 100. The scanner 304 scans available frequency channels for transmissions from the sensor nodes 104 and 106 and/or the coordinator 108. The energy source 308 provides power to operate the controller 300, the transducer 302, the scanner 304, the transceiver 306 and other components of the wireless sensor node 102. The energy source 308 may include a battery, an energy harvesting system, and/or other power source suitable for use in the wireless sensor node 102.

To connect to the network 100, the sensor node 102 must first receive a beacon from the coordinator 108 providing the service set identification (SSID) and other connection information for the network 100. In some embodiments, the network 100 operates in accordance with IEEE 802.15.4e in a sub-gigahertz or 2.4 GHz Industrial Scientific and Medical (ISM) band. There may be 16 channels for use within the 2.4 GHz band, each with 2 MHz of bandwidth and 5 MHz of channel separation available for the coordinator 108 and sensor nodes 102-106 to transmit and receive data. In some embodiments, other frequencies and/or a different number of channels, so long as the frequencies and channels are suitable for use in the network 100, may be used by the coordinator 108 and sensor nodes 102-106 to transmit and receive data.

In the network 100, transmission of beacons by the coordinator 108 (and information in general) is based on a channel hopping list that defines the channel sequence to be used for communication. Each value of the multi-value channel hopping list may be applied to a single timeslot. The controller 200 may define the channel hopping sequence. The channel hopping sequence may be of any length that accommodates the plurality of channels used by the network 100. For example, the length of the channel hopping list may be greater than the total numbers of channels available for transmission. More particularly, in the 2.4 GHz band utilizing 16 channels for transmission, the length of the channel hopping list may be greater than 16. For example, a channel hopping list may include 20 components, such as, {1, 7, 9, 4, 1, 8, 15, 16, 16, 1, 4, 3, 2, 15, 16, 8, 8, 8, 9, 8}, where the first value is assigned as "1" indicating that the first frequency channel of the 16 available channels is to be used for transmission.

Figure 4:
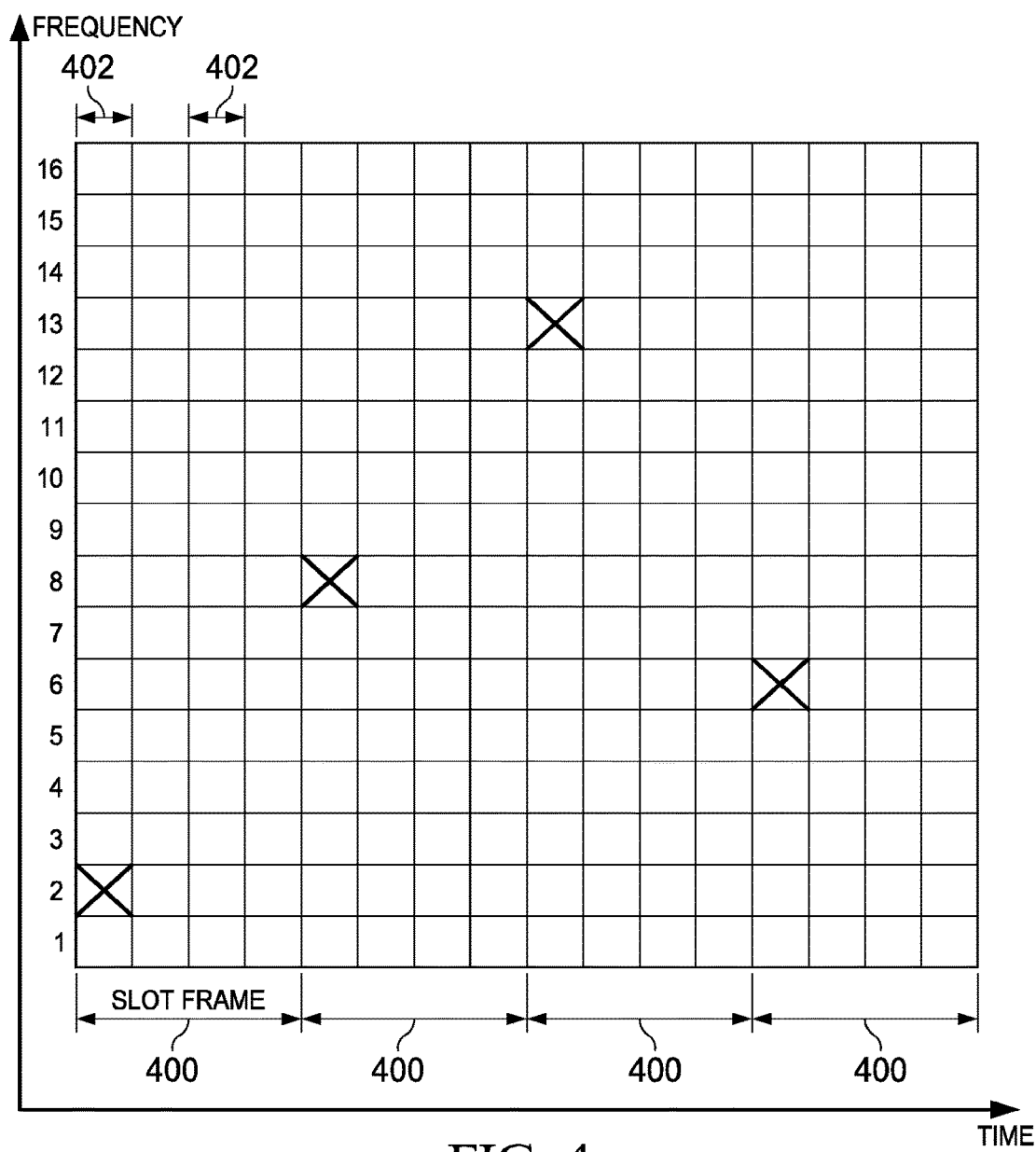
FIG. 4 shows illustrative slot frames and timeslots in a wireless sensor network in accordance with various embodiments.

FIG. 4 shows illustrative slot frames and timeslots in a wireless sensor network in accordance with various embodiments. Each slot frame 400 includes a plurality of timeslots 402 of equal duration. In each timeslot 402, communication occurs in one of the sixteen frequency bands (channels) as specified by the channel hopping list. In conventional wireless networks, a beacon may be transmitted on a different channel during each slot frame.

To reduce the time and energy required to identify a beacon transmission, embodiments of the system 100 limit the channels used for beacon transmission. The beacon transmission channels are limited by setting the size of the slot frame based on the length of the hopping sequence list. In the controller 200, the slot frame logic 206 computes the size of the slot frame 400 as:

$$\text{SlotFrameSize} = k * \text{HoppingSequenceLength} \quad (1)$$

where:
SlotFrameSize is the number of time slots in the slot frame;
k is an integer greater than zero; and
HoppingSequenceLength is the length of the hopping sequence list.

Thus, the slot frame logic 206 sets the length (number of timeslots) of the slot frame 400 to be an integer multiple of the length of the hopping sequence list.

Applying SlotFrameSize as defined above, the beacon transmission logic 208 determines on which channel to transmit a beacon signal as:

$$Bch = HoppingSequenceList[(ASN + ChannelOffset + \quad (2)$$
$$(j * SlotFrameSize))\% \ HoppingSequenceLength]$$
$$= HoppingSequenceList[(ASN + ChannelOffset)$$
$$\% \ HoppingSequenceLength]$$

where:
Bch is the channel on which the beacon is to be transmitted;
ASN is absolute sequence number, which is the number of timeslots that have elapsed since the start of the wireless network 100;
ChannelOffset is the channel offset applied by the wireless device;
j is the slot frame index; and
% is the modulo operator.

The initial ChannelOffset and ASN applied by coordinator 108 for beacon transmission can be known (i.e., programmed into) the sensor node 102 prior to joining the network 100.

As an example, consider a channel hopping list, {1, 6, 9, 4, 5, 16, 11 . . . } with a length of 40, and slot frame size set to an integer multiple of 40. The coordinator 108 transmits a first beacon signal during a first timeslot (ASN=1), i.e., the first slot of a first slot frame. The channel used for the first beacon signal is determined as:

$$Bch = HoppingSequenceList[(1 + 0)\%40] \quad (3)$$
$$= 1$$

Transmitting a second beacon at ASN 41, i.e., where 41 timeslots have passed yields:

$$Bch = HoppingSequenceList[(41 + 0)\%40] \quad (4)$$
$$= 1$$

Similarly, beacon transmission at ASN=81, ASN=121, etc. results in beacon transmission on channel 1. Thus, the relationship of the hopping channel list length and the slot frame size results in beacon transmission in the same channel over all slot frames.

To ensure network diversity, embodiments may transmit multiple beacons per timeslot, where the beacons are transmitted on different channels. More particularly, if "n" beacon signals are to be transmitted by the controller 200 in the first slot frame, the controller 200 uses "n" different values of ASN to transmit "n" beacon signals in "n" different channels. Applying the principles disclosed herein, each of the "n" different beacons will be transmitted on the same channel in each slot frame. For example, using the exemplary channel hopping list defined above, 3 beacon timeslots (1, 3, and 6) have been assigned by the controller 200 for beacon transmission in the first slot frame. Applying the beacon channel equation defined above, at respective ASN values of 1, 3 and 6, embodiments transmit beacons on channels 1, 9, and 16. Beacons are also transmitted on channels 1, 9, and 16 at respective ASN values 41, 43 and 46, and so on.

In some embodiments of the network 100, a wireless node 104 may serve as an intermediate (i.e., an intermediate node) between the coordinator 108 and the sensor node 102. In such an embodiment, the node 104 may transmit beacons for reception by the node 102, and for a given slot frame the beacons transmitted by the intermediate node may use the same channel as is used by the coordinator 108, or a different channel from that used by the coordinator. If the intermediate node is using the same channel as the coordinator 108 for beacon transmission, then the following conditions should be satisfied:

$$\text{SlotFrameSize} = k * \text{HoppingSequenceLength}, k > 1 \quad (5)$$

and $$\text{HoppingSequenceLength} > \text{NumberOfChannels} \quad (6)$$

Under these conditions, the intermediate node can selected a channel for beacon transmission in accordance with:

$$Bch = HoppingSequenceList[(imASN+imChannelOffset)\% HoppingSequenceLength] \quad (7)$$

where:

$$ASN-imASN = ChannelOffset-imChannelOffset, \quad (8)$$

and
imASN is the absolute sequence number that identifies the time slot to be used for beacon transmission by the intermediate node; and
imChannelOffset is the offset value for the intermediate node.

As noted above, the intermediate node may also transmit a beacon on a different channel than is used by the coordinator 108 for beacon transmission. In such an embodiment, the intermediate node may select the beacon channel in accordance with equation (7). To ensure diversity, the intermediate node may transmit multiple beacons per slot frame where each beacon is transmitted on a different channel. In such embodiments, each of the beacons is transmitted on the same channel in each slot frame as described herein with regard to the transmission of "n" beacons per slot frame by the coordinator 108.

Figure 5:
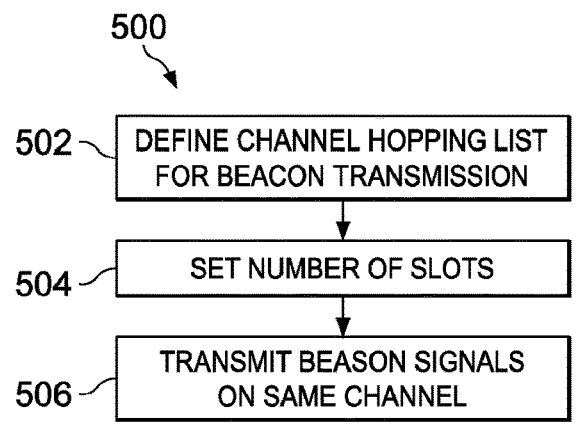
FIG. 5 shows a flow diagram for a method for generating beacon signals in accordance with various embodiments.

FIG. 5 shows a flow diagram for a method 500 for transmitting beacon signals in a wireless network in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 500, as well as other operations described herein, can be implemented as instructions stored in computer readable medium and executed by a processor (e.g., controller 200).

In block 502, the network coordinator 108 defines a channel hopping list that specifies on which channels of the network 100 communication is to occur. Beacons are transmitted on the channels specified by the channel hopping list in predetermined time slots of the slot frame.

In block 504, the network coordinator 108 sets a number of slots in each slot frame to be an integer multiple of the length of the channel hopping list. In some embodiments, the coordinator 108 may also define a virtual slot frame that is an integer multiple of the slot frame. The coordinator 108 may transmit beacons based on the virtual slot frame rather than the actual frame.

In block 506, the coordinator 108 transmits a beacon signal in each slot frame on a channel specified by the channel hopping list. Setting of the number of slots in each slot frame in block 504 causes the beacon signal to be transmitted on a same channel in each slot frame.

The operations of blocks 502-506 may also be applied to transmission of beacons by an intermediate node as disclosed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
defining, by a network coordinator for a wireless sensor network, a channel hopping list that includes a dedicated channel of the wireless sensor network in which a beacon signal is transmitted in a slot frame for the wireless sensor network;
setting a number of timeslots in the slot frame to be an integer multiple, greater than 1, of a length of the channel hopping list, the length of the channel hopping list being in excess of the number of channels which the network coordinator can access;
determining a first dedicated channel in the channel hopping list by:

$$Bch = HoppingSequenceList[(ASN+ChannelOffset)\% HoppingSequenceLength],$$

wherein Bch represents the first dedicated channel, HoppingSequenceList represents the channel hopping list, ASN represents a number of timeslots elapsed, ChannelOffset represents a channel offset, HoppinqSequenceLength represents the length of the channel hopping list, and % represents the modulo operator; and
transmitting a first beacon signal in the slot frame on the first dedicated channel, wherein the setting of the number of timeslots in the slot frame causes the first beacon signal to be transmitted on the first dedicated channel in the slot frame, and subsequent transmissions of the first beacon signal use the first dedicated channel.

2. The method of claim 1, further comprising:
transmitting a second beacon signal in the slot frame on a dedicated channel specified by the channel hopping list;
wherein the setting of the number of timeslots in the slot frame causes the second beacon signal to be transmitted on a second dedicated channel in the slot frame; and
wherein the second dedicated channel is different from the first dedicated channel.

3. The method of claim 1, further comprising:
transmitting a second beacon signal in the slot frame on a second dedicated channel specified by the channel hopping list; and
wherein the setting of the number of timeslots in the slot frame causes the second beacon signal to be transmitted on the second dedicated channel in the slot frame.

4. The method of claim 3, wherein the second dedicated channel is the same as the first dedicated channel and the second beacon signal is transmitted in a different timeslot of the slot frame from the first beacon signal.

5. The method of claim 3, wherein the second dedicated channel is different from the first dedicated channel.

6. The method of claim 3, further comprising:
transmitting a third beacon signal in the slot frame on a third dedicated channel specified by the channel hopping list;
wherein the setting of the number of timeslots in the slot frame causes the third beacon signal to be transmitted on the third dedicated channel in the slot frames; and
wherein the third dedicated channel is different from the second dedicated channel.

7. The method of claim 1, wherein setting of the number of timeslots in the slot frame causes the first beacon signal to be transmitted on the first dedicated channel in each of the slot frame.

8. A system, comprising:
a network coordinator configured to manage access to a wireless sensor network, the network coordinator comprising a controller configured to:
define a channel hopping list that includes a dedicated channel in which a beacon signal is transmitted in a slot frame on the wireless sensor network;

set a number of timeslots in the slot frame based on a length of the channel hopping list, wherein the number of timeslots is an integer multiple, greater than 1, of the length of the channel hopping list, the length of the channel hopping list being in excess of the number of channels which the network coordinator can access;

determine a first dedicated channel in the channel hopping list by:

$$Bch=HoppingSequenceList[(ASN+ChannelOffset)\% HoppingSequenceLength],$$

wherein Bch represents the first dedicated channel, HoppingSequenceList represents the channel hopping list, ASN represents a number of timeslots elapsed, ChannelOffset represents a channel offset, HoppinqSequenceLength represents the length of the channel hopping list, and % represents the modulo operator; and transmit a first beacon signal in the slot frame on the first dedicated channel, wherein the number of timeslots in the slot frame causes the first beacon signal to be transmitted on the first dedicated channel in the slot frame, and subsequent transmissions of the first beacon signal use the first dedicated channel.

9. The system of claim 8, wherein the controller is further configured to:

transmit a second beacon signal in the slot frame on a second dedicated channel specified by the channel hopping list;

wherein the number of timeslots in the slot frame causes the second beacon signal to be transmitted on the second dedicated channel in the slot frame; and wherein the second dedicated channel is different from the first dedicated channel.

10. The system of claim 8, wherein the controller is further configured to transmit a second beacon signal in the slot frame on a second dedicated channel in the channel hopping list; and wherein the number of timeslots in the slot frame causes the second beacon signal to be transmitted on a second dedicated channel in the slot frame.

11. The system of claim 10, wherein the controller is configured to transmit the second beacon signal in a different timeslot of the slot frames from the first beacon signal and on the first dedicated channel.

12. The system of claim 10, wherein the second dedicated channel is different from the first dedicated channel.

13. The system of claim 10, wherein the controller is configured to transmit a third beacon signal in the slot frames on a third dedicated channel specified by the channel hopping list;

wherein the number of timeslots in the slot frames causes the third beacon signal to be transmitted on the third dedicated channel in the slot frames; and wherein the third dedicated channel is different from the second dedicated channel.

14. A network coordinator, comprising:

a first wireless transceiver configured to communicate via a wireless sensor network; and a first controller configured to:

define a channel hopping list that includes a dedicated channel in which a beacon signal is transmitted in a slot frame for the wireless sensor network;

set a number of timeslots in the slot frame based on a length of the channel hopping list, wherein the number of timeslots is an integer multiple, greater than 1, of the length of the channel hopping list, the length of the channel hopping list being in excess of the number of channels which the first wireless transceiver can access;

determine a first dedicated channel in the channel hopping list by:

$$Bch=HoppingSequenceList[(ASN+ChannelOffset)\% HoppingSequenceLength],$$

wherein Bch represents the first dedicated channel, HoppingSequenceList represents the channel hopping list, ASN represents a number of timeslots elapsed, ChannelOffset represents a channel offset, HoppinqSequenceLength represents the length of the channel hopping list, and % represents the modulo operator; and transmit a first beacon signal in the slot frame on the first dedicated channel, wherein the number of timeslots in the slot frame causes the first beacon signal to be transmitted on the first dedicated channel in the slot frame; and transmit additional first beacon signals using the first dedicated channel.

15. The network coordinator of claim 14, wherein the first controller is further configured to:

transmit a second beacon signal in the slot frame on a second dedicated channel in the channel hopping list;

wherein the number of timeslots in the slot frame causes the second beacon signal to be transmitted on the second dedicated channel in the slot frame; and wherein the second dedicated channel is different from the first dedicated channel.

16. The network coordinator of claim 14, wherein the first controller is configured to apply a virtual slot frame to beacon transmission, wherein the virtual slot frame includes a number of timeslots that is an integer multiple of the number of timeslots in the slot frame.

17. The network coordinator of claim 14, wherein setting of the number of timeslots in the slot frame causes the first beacon signal to be transmitted on the first dedicated channel in each of the slot frame.

18. A system, comprising:

a network coordinator configured to manage access to a wireless sensor network, the network coordinator comprising a controller configured to:

define a channel hopping list that includes a dedicated channel in which a beacon signal is transmitted in a slot frame on the wireless sensor network;

set a number of timeslots in the slot frame based on a length of the channel hopping list, wherein the number of timeslots is an integer multiple, greater than 1, of the length of the channel hopping list, the length of the channel hopping list being in excess of the number of channels which the network coordinator can access; and transmit a first beacon signal in the slot frame on a first dedicated channel in the channel hopping list, wherein the number of timeslots in the slot frame causes the first beacon signal to be transmitted on the first dedicated channel in the slot frame, and subsequent transmissions of the first beacon signal use the first dedicated channel; and an intermediate node configured to intermediate between the network coordinator and a sense node of the wireless sensor network, wherein the intermediate node is configured to transmit beacons for reception by the sense node using a same channel in the slot frame used by the network coordinator.

19. A system, comprising:
- a network coordinator configured to manage access to a wireless sensor network, the network coordinator comprising a controller configured to:
  - define a channel hopping list that includes a dedicated channel in which a beacon signal is transmitted in a slot frame on the wireless sensor network;
  - set a number of timeslots in the slot frame based on a length of the channel hopping list, wherein the number of timeslots is an integer multiple, greater than 1, of the length of the channel hopping list, the length of the channel hopping list being in excess of the number of channels which the network coordinator can access; and
  - transmit a first beacon signal in the slot frame on a first dedicated channel in the channel hopping list, wherein the number of timeslots in the slot frame causes the first beacon signal to be transmitted on the first dedicated channel in the slot frame, and subsequent transmissions of the first beacon signal use the first dedicated channel; and
- an intermediate node configured to intermediate between the network coordinator and a sense node of the wireless sensor network, wherein the intermediate node is configured to transmit beacons for reception by the sense node using a different channel in the slot frame than used by the network coordinator.

* * * * *